W. WEDDINGTON.
Churn.
No. 67,090.
Patented July 23, 1867.
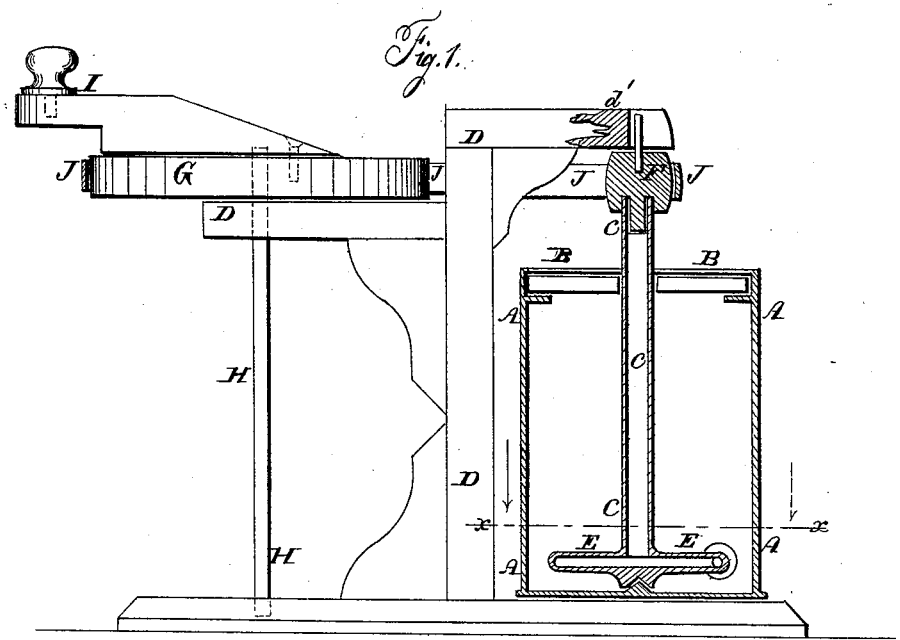

United States Patent Office.

WILLIAM WEDDINGTON, OF WINTERSET, IOWA.

Letters Patent No. 67,090, dated July 23, 1867.

IMPROVEMENT IN CHURNS.

The Schedule referred to in these Letters Patent and making part of the same.

TO ALL WHOM IT MAY CONCERN:

Be it known that I, WILLIAM WEDDINGTON, of Winterset, in the county of Madison, and State of Iowa, have invented a new and useful Improvement in Churns; and I do hereby declare that the following is a full, clear, and exact description thereof, which will enable others skilled in the art to make and use the same, reference being had to the accompanying drawings, forming part of this specification, in which—

Figure 1 is a side view of my improved churn, partly in section through the line $y\ y$, fig. 2.

Figure 2 is a detail sectional view of the same, taken through the line $x\ x$, fig. 1.

Similar letters of reference indicate like parts.

My invention has for its object to furnish an improved churn, so constructed and arranged that the churning may be done by air introduced into the churn; and it consists in the combination of a hollow shaft or tube, having one or more elbow-tubes attached to its lower end, with the body of the churn, and in the combination of the horizontal crank-wheel, band, and pulley with the hollow shaft and frame of the machine, the whole being constructed and arranged as hereinafter more fully described.

A is the body of the churn, and B is the lid or cover, about the construction of which parts there is nothing new. C is a hollow shaft or tube, the lower end of which is pivoted to the middle of the bottom of the churn. E are two elbow-shaped tubular arms, attached to the lower end of the tube C. The end parts of the arms E may be made slightly flaring, and may, if desired, have holes formed through their sides, as shown in fig. 2. The upper part of the tube C has a hole formed through its side above the cover B, as shown in fig. 1. The upper end of the tube C is closed, has a pulley, F, attached to it, and is pivoted to the beam $d'$ of the frame D, as shown in fig. 1. G is a large horizontal wheel or pulley, which is pivoted to the frame D by the shaft H, and to which is attached a crank or handle, I. J is a band, passing around the pulleys G and F, as shown in fig. 1.

In using the machine, the air passes into the tube C through the opening in its side, and is forced out of the elbow-tubes or arms E by the revolution of the tube C, which forces the air out by centrifugal force, and also by the tendency of the revolving arms to form a vacuum at their ends. The air as it escapes from the tubes rises through the milk, throwing it into violent agitation, and bringing the butter in a very short time.

What I claim as new, and desire to secure by Letters Patent, is—

1. The combination of the hollow shaft or tube C, having one or more elbow-tubes E attached to its lower end, with the body A of the churn, substantially as herein shown and described and for the purpose set forth.

2. The combination of the horizontal crank-wheel or pulley G, band J, and pulley F, with the tube C, substantially as herein shown and described and for the purpose set forth.

WILLIAM WEDDINGTON.

Witnesses:
 ISAAC KOCH,
 JOHN S. McCAUGHAN.